(12) United States Patent
van Alen (10) Patent No.: US 10,428,742 B2
(45) Date of Patent: Oct. 1, 2019

(54) FUEL DELIVERY SYSTEM AND METHOD FOR A GAS TURBINE ENGINE

(71) Applicant: General Electric Company, Schenectady, NY (US)

(72) Inventor: Frederick Ehrwulf van Alen, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 409 days.

(21) Appl. No.: 15/175,154

(22) Filed: Jun. 7, 2016

(65) Prior Publication Data
US 2017/0350323 A1 Dec. 7, 2017

(51) Int. Cl.
| | | |
|---|---|---|
| *F02C 7/22* | (2006.01) | |
| *F02C 9/26* | (2006.01) | |
| *F01D 17/16* | (2006.01) | |
| *F02C 7/232* | (2006.01) | |
| *F02C 9/30* | (2006.01) | |
| *F02C 9/32* | (2006.01) | |

(52) U.S. Cl.
CPC ............ *F02C 9/263* (2013.01); *F01D 17/162* (2013.01); *F02C 7/232* (2013.01); *F02C 9/30* (2013.01); *F02C 9/32* (2013.01); *F05D 2220/32* (2013.01); *F05D 2240/12* (2013.01); *F05D 2260/406* (2013.01); *F05D 2270/01* (2013.01); *F05D 2270/301* (2013.01); *F05D 2270/62* (2013.01); *F05D 2270/64* (2013.01); *Y02T 50/671* (2013.01)

(58) Field of Classification Search
CPC .. F02C 7/22; F02C 7/232; F02C 9/263; F02C 9/30; F02C 9/32; F02C 7/236; F02C 9/26; F02C 9/28; F05D 2270/301; F05D 2270/64
See application file for complete search history.

(56) References Cited

U.S. PATENT DOCUMENTS

| | | |
|---|---|---|
| 2,764,231 A | 9/1956 | Jubb |
| 5,086,617 A | 2/1992 | Smith |
| 5,927,064 A * | 7/1999 | Dyer ...................... F01D 21/02 60/39.281 |

(Continued)

FOREIGN PATENT DOCUMENTS

EP  2 891 768 A1  7/2015

OTHER PUBLICATIONS

International Search Report and Written Opinion issued in connection with corresponding PCT Application No. PCT/US17/33209 dated Jul. 28, 2017.

*Primary Examiner* — William H Rodriguez
(74) *Attorney, Agent, or Firm* — Dority & Manning, P.A.

(57) ABSTRACT

A gas turbine engine and method of operation are provided. The gas turbine engine may include a variable geometry component operably driven by a component actuator. The component actuator may be in fluid communication with a primary line having a valve associated therewith. The method may include determining a demand pressure associated with actuating the variable geometry component using the component actuator. The method may also include adjusting a position of the valve based on the demand pressure to generate a fuel pressure at the component actuator that is greater than or equal to the demand pressure.

12 Claims, 3 Drawing Sheets

(56) References Cited

U.S. PATENT DOCUMENTS

| | | | |
|---|---|---|---|
| 6,619,027 B1 * | 9/2003 | Busch | F02C 9/38 |
| | | | 60/39.281 |
| 6,745,556 B2 * | 6/2004 | Elliott | F02C 9/263 |
| | | | 60/39.281 |
| 7,096,658 B2 | 8/2006 | Wernberg et al. | |
| 7,185,485 B2 | 3/2007 | Lewis | |
| 7,204,076 B2 | 4/2007 | Griffiths et al. | |
| 7,337,761 B2 * | 3/2008 | Bickley | F01D 21/00 |
| | | | 123/198 DB |
| 7,409,855 B2 | 8/2008 | Flint | |
| 8,511,330 B1 | 8/2013 | Rickis | |
| 8,991,186 B2 | 3/2015 | Bickley et al. | |
| 9,032,786 B2 | 5/2015 | Masse et al. | |
| 9,739,208 B2 * | 8/2017 | Griffiths | F02C 9/263 |
| 9,771,906 B2 * | 9/2017 | Henson | F02C 7/236 |
| 2003/0074884 A1 | 4/2003 | Snow et al. | |
| 2005/0262824 A1 * | 12/2005 | Yates | F02C 7/232 |
| | | | 60/39.281 |
| 2006/0130455 A1 * | 6/2006 | Griffiths | F02C 7/228 |
| | | | 60/39.281 |
| 2010/0263634 A1 | 10/2010 | Futa, Jr. et al. | |
| 2012/0261000 A1 * | 10/2012 | Futa | F02C 7/232 |
| | | | 137/101 |
| 2013/0263826 A1 | 10/2013 | Bickley | |
| 2014/0196459 A1 * | 7/2014 | Futa | F02C 7/22 |
| | | | 60/734 |
| 2014/0216037 A1 | 8/2014 | MacDonald | |
| 2015/0027412 A1 * | 1/2015 | Henson | F02C 7/236 |
| | | | 123/457 |
| 2015/0192073 A1 * | 7/2015 | Griffiths | F02C 7/22 |
| | | | 60/734 |
| 2016/0245188 A1 * | 8/2016 | Selstad | F02C 9/32 |
| 2016/0306365 A1 * | 10/2016 | Wilson | G05D 7/0635 |
| 2017/0321608 A1 * | 11/2017 | Crowley | F02C 7/222 |

* cited by examiner

FUEL DELIVERY SYSTEM AND METHOD FOR A GAS TURBINE ENGINE

FIELD OF THE INVENTION

The present subject matter relates generally to gas turbine engines, and more particularly, to a fuel delivery system for a gas turbine engine.

BACKGROUND OF THE INVENTION

During operation of a typical gas turbine engine, fuel may be supplied to a combustion section before being ignited to drive rotation of one or more turbines. In order to ensure proper combustion and/or power generation, a fuel metering and pressurization system is generally provided in operative association with the gas turbine engine. Typically, multiple hydro-mechanical valves are connected in series to regulate the amount of fuel delivered to the combustion section, as well as the pressure available for servo actuation. For instance, a fuel metering and pressurization system may include a fuel metering valve that sets the flowrate of fuel to a combustion section of an engine. A hydro-mechanical pressurization valve downstream from the fuel metering valve may control the pressure available for servo actuation. The hydro-mechanical pressurization valve may be referenced to the output of a fuel pump.

Within such conventional systems, fuel is typically circulated by a pumping unit tied to the operating speed of the engine. Excess fuel, or fuel in excess of that needed for combustion, is recirculated to one or more bypass circuits. Moreover, in the case of some fuel metering and pressurization systems, fuel within one or more bypass circuits can be directed to/from a variable geometry component, such as a variable guide vane, of the engine. The force or pressure used to actuate the guide vane may, thus, correlate to fuel pressure within the system. In turn, this force or pressure may vary according to the changing demands of the aircraft.

However, existing systems must often accommodate occasions in which demands for actuating the variable geometry components are misaligned with the fuel demand of the combustion section. Fuel demand at the combustion section may limit fuel flow within the fuel metering and pressurization system faster than the engine speed, and, thus, may limit fuel flow faster than the actuation force needed to move the variable geometry components is reduced. In the case of a rejected takeoff event, fuel demand at the combustion section may significantly decrease fuel flow faster than the pressure required for actuating a variable geometry component.

In order to accommodate for such variations in demand, existing systems are often sized and configured to accommodate conflicts between pressure requirements of an engine's variable geometry components and its combustion section. Bypass valves and circuit members, such as actuators, pumps, and heat exchangers, thus, are often configured to be oversized. The increased size allows for a required actuation force to be achieved with reduced fuel system pressures available for actuating a variable guide vane, even when fuel flow is suddenly limited. Nonetheless, existing oversized configurations can result in significant weight being added to the engine. Moreover, the increased size of a system's constituent elements may result in increased amounts of power being drawn from the engine. Drawing power to circulate fuel may reduce the amount of power available for propulsion, decreasing overall engine efficiency. Furthermore, the increased circulation of fuel may result in increased amounts of heat being carried by the fuel within the system.

Accordingly, there is a need for a fuel system that can provide adequate fuel pressurization to various portions of an engine, without requiring significantly oversized elements. There is further need for a fuel system that can reduce power demands over the fuel system and increase overall engine efficiency and/or reduce engine weight.

BRIEF DESCRIPTION OF THE INVENTION

Aspects and advantages of the invention will be set forth in part in the following description, or may be obvious from the description, or may be learned through practice of the invention.

In one aspect of the present disclosure, a method of regulating fuel in a gas turbine engine is provided. The gas turbine engine may include a variable geometry component operably driven by a component actuator. The component actuator may be in fluid communication with a primary line having a valve associated therewith. The method may include determining a demand pressure associated with actuating the variable geometry component using the component actuator. The method may also include, determining a desired valve position for the valve based on the demand pressure. The method may further include adjusting a position of the valve based on the demand pressure to generate a fuel pressure at the component actuator that is greater than or equal to the demand pressure.

In another aspect of the present disclosure, a fuel delivery system for a gas turbine engine is provided. The gas turbine engine may include a combustion section and a variable geometry component. The fuel delivery system may include a component actuator, a primary line, a valve, and a control device. The component actuator may be configured to actuate the variable geometry component. The primary line may be in fluid communication with the component actuator. The valve may be in fluid communication with the primary line. The control device may be in operable communication with the valve. The controller may be configured to determine a demand pressure associated with actuating the variable geometry component using the component actuator, and adjust a position of the valve based on the demand pressure to generate a fuel pressure at the component actuator that is greater than or equal to the demand pressure.

In yet another aspect of the present disclosure, a gas turbine engine is provided. The gas turbine engine may include a drive shaft, a turbine, a combustion section, a variable geometry component, and a fuel system. The drive shaft may extend along the central axis. The turbine may be attached to the drive shaft to provide rotation of the drive shaft. The combustion section may be positioned forward of the turbine to provide a combustion gas thereto. The variable geometry component may be positioned in a flow path of the gas turbine engine. The fuel system may include a component actuator, a primary line, a fuel pressurization valve, and a control device. The component actuator may be configured to actuate the variable geometry component. The primary line may be in fluid communication with the component actuator. The fuel pressurization valve may be in fluid communication with the primary line. The control device may be in operable communication with the fuel pressurization valve and configured to adjust a position of the fuel pressurization valve based on a demand pressure to generate a fuel pressure at the component actuator that is greater than or equal to the demand pressure of the component actuator.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

In some embodiments, the present disclosure provides a gas turbine engine that includes at least one movable component that is hydraulically driven or moved by fuel redirected from the flow of fuel to a combustion section of the engine. The supply and pressure of the redirected fuel may be controlled and/or varied according to a force acting upon the moveable component.

Figure 1:
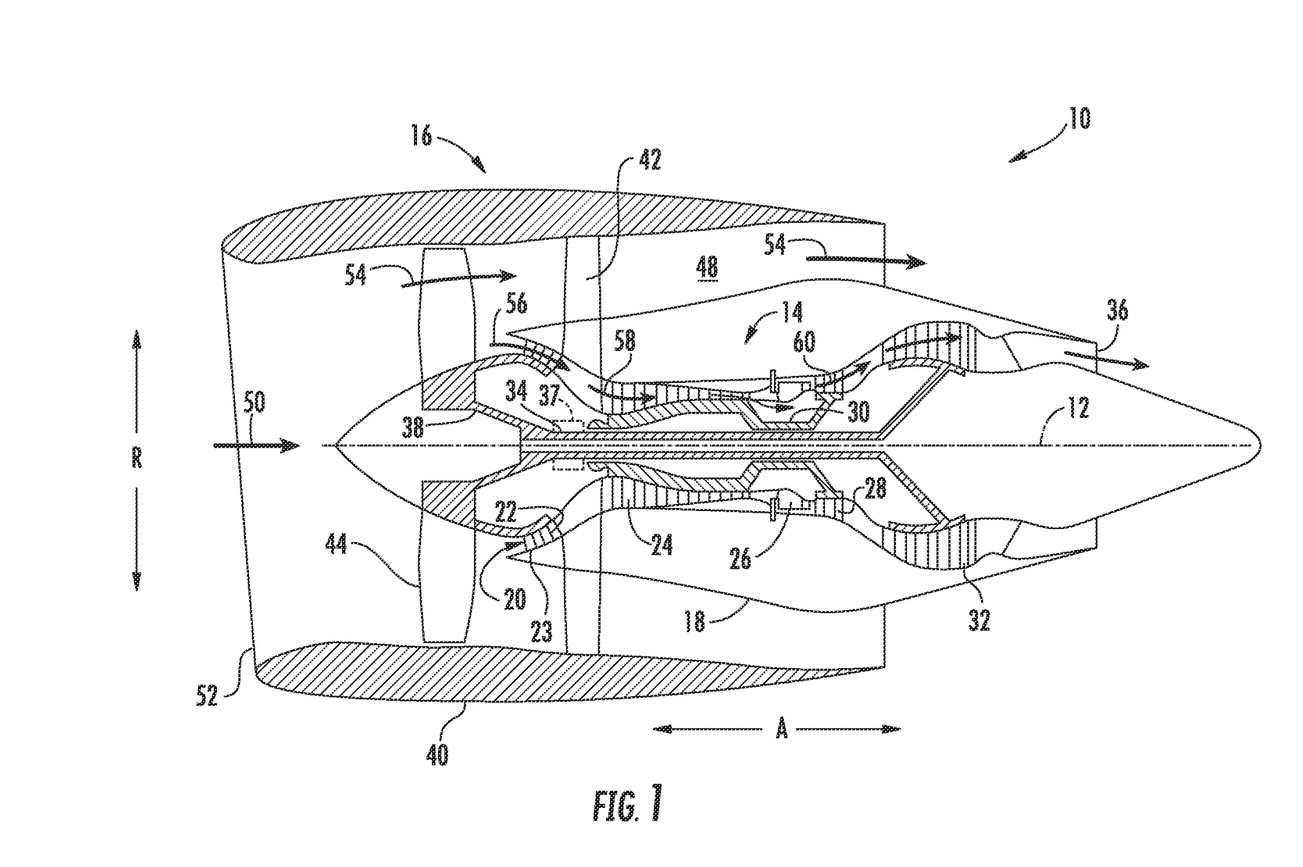
FIG. 1 provides a cross-sectional view of an example gas turbine engine in accordance with one or more embodiments of the present disclosure.

Turning now to the figures, FIG. 1 is a cross-sectional view of an example high-bypass turbofan type engine 10. The turbofan engine 10 may be utilized within an aircraft in accordance with aspects of the present subject matter, with the engine 10 being shown having a longitudinal or axial centerline axis 12 extending parallel to an axial direction A for reference purposes. The engine 10 includes a core gas turbine engine 14 and a fan section 16 positioned upstream thereof. The core engine 14 of the illustrated embodiment includes a substantially tubular outer casing 18 that defines an annular inlet 20. The outer casing 18 further encloses and supports a low pressure (LP) compressor 22 for increasing the pressure of the air that enters the core engine 14 to a first pressure level. A multi-stage high pressure (HP) compressor 24 subsequently receives the pressurized air from the LP compressor 22 and further increase the pressure of the received air. The pressurized air exiting the HP compressor 24 may then flow to a combustor 26 within which fuel is injected into the flow of pressurized air. The resulting mixture is combusted within the combustor 26. The high energy combustion products are directed from the combustor 26 along a hot gas path of the engine 10 to an HP turbine 28 and drive the HP compressor 24 via an HP drive shaft 30, and then to an LP turbine 32 for driving the LP compressor 22 and fan section 16 via an LP drive shaft 34 that is generally coaxial with HP drive shaft 30. After driving each of turbines 28 and 32, the combustion products may be expelled from the core engine 14 via an exhaust nozzle 36 to provide propulsive jet thrust.

A plurality of inlet guide vanes 23 is positioned at the inlet of the LP compressor 22. Generally, the inlet guide vanes 23 are disposed in an annular array about the centerline axis 12. The vanes 23 may be configured as variable geometry components, which may alter at least a portion of the airflow geometry for the gas turbine engine 10. In certain embodiments, each inlet guide vane 23 may define a respective pitch axis about which it is rotatable by an actuator (not pictured). Rotation of the inlet guide vanes 23 about their respective pitch axes may direct a flow of air through the engine core 14 and/or reduce an amount of airflow through the core turbine engine 14, as discussed below. In optional embodiments, one or more additional or alternative variable geometry components, such as a variable bleed valve, may be provided to match the inlet airflow of the LP compressor 22 to operational requirements and, e.g., prevent compressor stall.

In optional embodiments, one or more of the compressors 22, 24 includes one or more variable geometry components, such as a plurality of variable stator vanes, which may alter at least a portion of the airflow geometry for the gas turbine engine 10. In certain embodiments, each variable stator vane may define a respective pitch axis about which it is rotatable by an actuator (not pictured). Rotation of variable stator vanes about their respective pitch axes may direct a flow of air through the engine core 14 and/or reduce an amount of airflow through the core turbine engine 14.

Similarly, it should be appreciated that each turbine 28, 32 may generally include one or more turbine stages, with each stage including a plurality of nozzle vanes disposed in an annular array about the centerline axis 12 of the engine 10 for directing the flow of combustion products through the turbine stage towards a corresponding annular array of rotor blades forming part of the turbine rotor. As is generally understood, the rotor blades may each be coupled to a rotor disk of a respective turbine rotor, which is, in turn, coupled to the engine's drive shaft (e.g., drive shaft 30 or 34).

Additionally, as shown in FIG. 1, the fan section 16 of the engine 10 includes a rotatable, axial-flow fan rotor 38 that is configured to be surrounded by an annular fan casing 40. In particular embodiments, the LP drive shaft 34 may be connected directly to the fan rotor 38, such as in a direct-drive configuration. In alternative configurations, the LP drive shaft 34 may be connected to the fan rotor 38 via a speed reduction device 37, such as a reduction gear gearbox in an indirect-drive or geared-drive configuration. Such speed reduction devices may be included between any suitable shafts/spools within engine 10 as desired or required.

The fan casing 40 may be configured to be supported relative to the core engine 14 by a plurality of substantially radially-extending, circumferentially-spaced outlet guide vanes 42. As such, the fan casing 40 encloses the fan rotor 38 and its corresponding fan rotor blades 44. Moreover, a downstream section 46 of the fan casing 40 extends over an outer portion of the core engine 14 so as to define a secondary, or by-pass, airflow conduit 48 that provides additional propulsive jet thrust. Similar to the above-described inlet guide vanes 23, the outlet guide vanes 42 and/or the fan rotor blades 44 may be configured as variable geometry components capable of being rotated about their respective pitch axes to provide one or more desired airflow characteristics for the air flowing through the engine 10.

During normal or routine operation of the engine 10, it should be appreciated that an initial airflow (indicated by arrow 50) may enter the engine 10 through an associated inlet 52 of the fan casing 40. The airflow 50 then passes through the fan blades 44 and splits into a first compressed airflow (indicated by arrow 54) that moves through conduit 48 and a second compressed airflow (indicated by arrow 56) which enters the LP compressor 22. The pressure of the second compressed airflow 56 is then increased and enters the HP compressor 24 (as indicated by arrow 58). After mixing with fuel and being combusted within the combustor 26, the combustion products 60 exit the combustor 26 and flow through the HP turbine 28. Thereafter, the combustion products 60 flow through the LP turbine 32 and exit the exhaust nozzle 36 to provide thrust for the engine 10.

It should be appreciated that the example turbofan engine 10 depicted in FIG. 1 is provided by way of example only. In other example embodiments, the engine 10 may have any other suitable configuration. For instance, in certain example embodiments, the engine 10 may not include the LP compressor 22, and thus, the LP turbine 32 may only support rotation of the LP spool 34 to provide rotational power to the fan section 16. Additionally, the engine 10 may include various actuators, guide vanes, ports, etc. not described herein or depicted in FIG. 1. Further, in still other example embodiments, the engine 10 may instead be configured as any other suitable gas turbine engine. For instance, in other example embodiments, aspects of the present disclosure may be used in conjunction with, e.g., a turboshaft engine, turboprop engine, turbocore engine, turbojet engine, etc.

Figure 2:
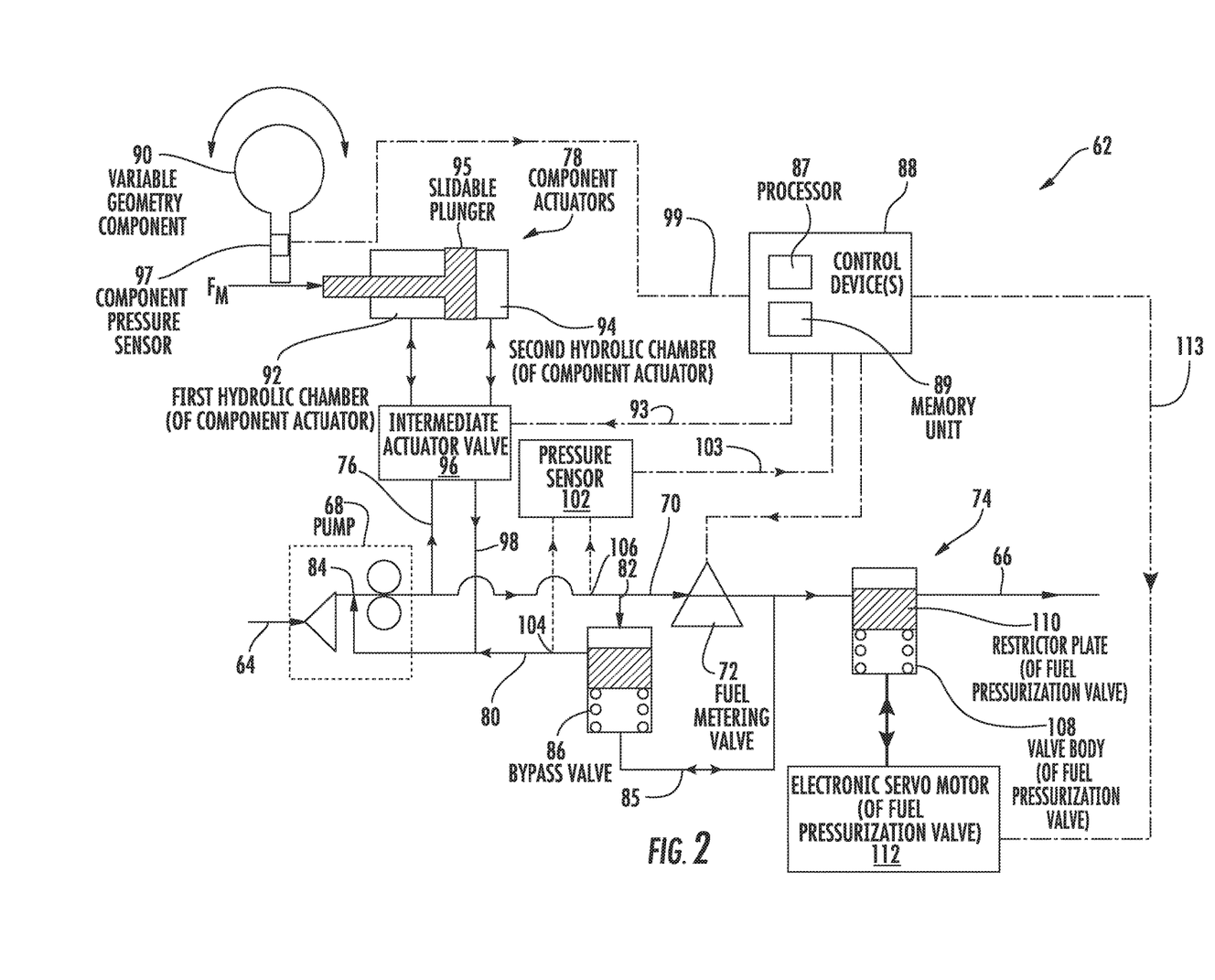
FIG. 2 provides a schematic view of an example fuel delivery system in accordance with one or more embodiments of the present disclosure.

Turning to FIG. 2, a schematic view of one embodiment of a fuel delivery system 62 is illustrated in accordance with aspects of the present subject matter. The system 62 may be incorporated into, e.g., the example turbofan engine 10 of FIG. 1. Accordingly, the same or similar numbers may refer to the same or similar parts described above. Generally, the fuel delivery system 62 may include one or more fuel lines for supplying fuel to/from various portions of a gas turbine engine 10 (see FIG. 1). For instance, as shown in FIG. 2, the fuel delivery system 62 includes at least one fuel input line 64 in fluid communication with a fuel supply (not pictured), and at least one output line 66 in fluid communication with a combustion section, e.g., combustor 26 (see FIG. 1), of the gas turbine engine 10.

In some embodiments, a pump 68 is provided to draw fuel from the fuel input line 64 and supply such fuel to a primary line 70 in fluid communication therewith. The pump 68 can be configured as a suitable rotary pump to motivate fuel through the primary line 70. For instance, the pump 68 can be provided as a suitable gear pump or vane pump configuration. Optionally, the pump 68 may include a centrifugal stage configured to provide sufficient inlet pressure to a gear stage and/or sufficient discharge pressure for a bypass valve. Moreover, the pump 68 can be operably connected to one or more drive shafts of the engine 10, e.g., HP drive shaft 30 or LP drive shaft 34 (see FIG. 1), to control rotation of the pump 68. Optionally, a mechanical linkage or gear train (not pictured) can be provided between the engine drive shaft and the pump 62. As the rotational speed of the engine 10 increases, the operating or rotational speed of the pump 68 also increases. Similarly, as the rotational speed of the engine 10 decreases, so too does the rotational speed of the pump 68. In turn, the flowrate of fuel across the pump 68 can be at least partially determined by the rotational or operating speeds of the pump 68 and/or the engine. For instance, the flowrate of fuel entering the pump 68 may be defined by fuel flow delivered to the engine. The flowrate of fuel exiting the pump 68 may be determined by the rotational speed of the pump 68.

As shown, the primary line 70 extends from the pump 68 and directs fuel to various portions of the fuel delivery system 62. Specifically, the primary line 70 extends from the pump 68 to a fuel metering valve 72. Another portion of the primary line 70 extends from the fuel metering valve 72 and directs fuel flow across a fuel pressurization valve 74 and to the output line 66. Additionally, in some embodiments, a servo line 76 is disposed on the primary line 70 downstream from the pump 68. The servo line 76 is configured in fluid communication with the primary line 70 and can selectively draw a portion of the fuel flowing through the primary line 70. During certain operations, the servo line 76 can direct fuel to one or more component actuators 78 (described in more detail below) motivated through fuel pressure supplied by the primary line 70.

In some embodiments, a bypass line 80 is additionally provided along the primary line 70 upstream from the fuel metering valve 72. In the embodiment of FIG. 2, the bypass line 80 includes a bypass inlet 82 disposed on the primary line 70 at a point downstream from the servo line 76. A portion of fuel not drawn into the servo line 76 may, thus, be received by the bypass inlet 82 as it is drawn into the bypass line 80. In one embodiment, fuel within the bypass line 80 will be supplied upstream from the fuel metering valve 72 and redirected to an upstream portion of the primary line 70, e.g., via the pump 68. A bypass outlet 84 disposed on the primary line 70 is further provided upstream from the servo line 76. Fuel within the bypass line 80 can be returned to the primary line 70 after flowing through the bypass outlet 84. In some embodiments, a bypass valve 86 is provided within the bypass line 80 and restricts fuel from the bypass inlet 82 to the bypass outlet 84. Optionally, the bypass valve 86 may be configured to bypass excess fuel before reaching the fuel metering valve 72 and regulate differential pressure across the fuel metering valve 72.

In the illustrated embodiment of FIG. 2, one or more control devices 88 are provided to control the operation of one or more elements of the fuel system 62. For example, the control device(s) 88 may be communicatively coupled to the fuel pressurization valve 74 (e.g., via an electronic servo motor 112 in operative association with the valve 74) to allow the operation of such valve 74 to be automatically controlled by the control device(s) 88. In certain embodiments, this may include a wired or a wireless connection between the control device(s) 88 and the fuel pressurization valve 74 and/or electronic servo motor 112.

In some embodiments, the control device(s) 88 includes a discrete processor 87 and memory unit 89. Optionally, the control device(s) 88 can include a full authority digital engine control (FADEC), or another suitable engine control unit. The processor 87 may include a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. The processor 87 may also include a microprocessor, or a combination of the aforementioned devices (e.g., a combination of a DSP and a microprocessor, a plurality of microprocessors, one or more microprocessors in conjunction with a DSP core, or any other such configuration).

Additionally, the memory unit(s) 89 may generally comprise memory element(s) including, but not limited to, computer readable medium (e.g., random access memory (RAM)), computer readable non-volatile medium (e.g., a flash memory, EEPROM, NVRAM or FRAM), a compact disc-read only memory (CD-ROM), a magneto-optical disk (MOD), a digital versatile disc (DVD), and/or other suitable memory elements. The memory unit(s) 89 can store information accessible by processor(s) 87, including instructions that can be executed by processor(s) 87. For example, the instructions can be software or any set of instructions that when executed by the processor(s) 87, cause the processor(s) 87 to perform operations. For certain embodiments, the instructions include a software package configured to operate the system 62 to, e.g., execute the example method (200) described below with reference to FIG. 3.

As shown in FIG. 2, the component actuator 78 is attached to the primary line 70 through the servo line 76. During operation, the component actuator 78 may generally determine the position of one or more variable geometry components 90. The component actuator 78 may, for instance, pivot or rotate a variable geometry component 90 about a respective pitch axis. Additionally or alternatively, component actuator 78 may translate a variable geometry component 90 along a linear path. An actuator for each variable geometry component 90 is provided to determine and alter the positioning or geometry of each variable geometry component 90. In optional embodiments, the variable geometry component 90 is embodied as a variable guide vane, such as the inlet guide vane 23, outlet guide vane 42, fan rotor blade 44, or a vane (e.g., stator vane) of the compressors 22, 24 or turbines 28, 32 (see FIG. 1). Each actuator 78 can be configured as a rotary actuator configured to impart rotational force to a variable guide vane or other suitable variable geometry component 90. Alternatively, each actuator can be configured as a linear actuator configured to impart a translational force to the variable guide vane or other suitable variable geometry component 90.

In several embodiments, the component actuator 78 may include a hydraulic cylinder defining opposing hydraulic chambers 92, 94. In such embodiments, the chambers 92, 94 may be fluidly separated by, for instance, at least a portion of a slidable piston 95. Movement of the piston 95 may, thus, increase or decrease the volume within the chambers 92, 94. Generally, the piston 95 may be operably attached to the variable geometry component 90 such that linear actuation of the piston 95 results in movement of the variable geometry component 90, e.g., about its pitch axis. In the illustrated embodiment, the flow of fuel into and out of the hydraulic chambers 92, 94 may determine the position of the piston 95, and thus, the position of the variable geometry component 90. Each chamber 92, 94 increases or decreases in volume according to the position of the variable geometry component 90. During operation of the system 62, fuel can be supplied to one chamber 92 or 94 as fuel is withdrawn from the opposing chamber 94 or 92. Movement of the fuel into and out of chambers 92, 94 may, thus, serve to alter the operable position of the actuator 78. Although a linear hydraulic actuator is illustrated in FIG. 2, additional or alternative embodiments may include another suitable actuation system driven at least partially by a variable hydraulic component, such as a rotary actuator.

Additionally, the system 62 may also include an intermediate actuator valve 96 (e.g., a hydraulic servo valve) provided in fluid communication between the servo line 76 and the component actuator 78. Moreover, the valve 96 may control the flow of fluid to each of the opposing chambers 92, 94. The actuator valve 96 can be in operable communication with the control device(s) 88, e.g., through an electric or wireless signal through signal path 93, to allow the flow of fluid to each chamber 92, 94 to be automatically controlled. During operation, the control device(s) 88 may activate the actuator valve 96 to direct or restrict the flow of fuel to/from the two chambers 92, 94, thereby controlling the actuation of the actuator 78.

In optional embodiments, a return line 98 is disposed in fluid communication with the component actuator 78 to direct fuel therefrom. For instance, the return line 98 can extend from the actuator valve 96 to the bypass line 80. The actuator valve 96 can selectively direct fuel to the bypass line 80. In some such embodiments, the pressure difference between the primary line 70 and the return line 98 can provide the motivating force or pressure to effectuate the control of the component actuator 78, and thereby, the variable geometry component 90.

Still referring to the example embodiment of FIG. 2, one or more pressure sensors 102 are provided to monitor (e.g., compute or detect) the pressure of fuel being supplied to the component actuator 78 and/or actuator valve 96. In some embodiments, a first pressure sensor element 106 is provided in the primary line 70 in operable communication with the control device(s) 88 e.g., through an electric or wireless signal through signal path 103. As shown, the first pressure sensor element 106 is provided on the primary line 70 between the pump 68 and the fuel metering valve 72. In exemplary embodiments, the first pressure sensor element 106 is provided on the primary line 70 between the servo line 76 and the bypass inlet 82. Pressure detected at the first sensor element 106, e.g., as a pressure signal, may thus be communicated to the control device(s) 88 where the pressure is monitored or registered. In additional or alternative embodiments, a second pressure sensor element 104 is provided in the bypass line 80. As shown, the second pressure sensor 104 is disposed between the bypass inlet 82 and the bypass outlet 84. In exemplary embodiments, the second pressure sensor 104 is provided on the bypass line 80 between the bypass valve 86 and the return line 98. Similar to the first pressure sensor element 106, pressure detected at the second pressure sensor element 104 may be communicated to the control device(s) 88, which monitors or registers the received pressure.

In optional embodiments, the first and second pressure sensor elements 104, 106 are included as part of a unitary differential pressure sensor 102. During use, the differential pressure sensor 102 can detect the difference in fuel pressure between the primary line 70 and the bypass line 80. In some such embodiments, the differential pressure sensor 102 is in operable communication with the control device(s) 88 to thereby communicate a pressure difference ($P_D$) signal or value, e.g., selectively or continuously.

As noted above, the fuel metering valve 72 is provided in fluid communication with the primary line downstream of the servo line 76 and the bypass inlet 82. Generally, the fuel metering valve 72 is configured to regulate a fuel flowrate to a combustion section of the engine. Based at least in part on one or more throttling signals, e.g., from the control device(s) 88, the fuel metering valve 72 can increase or decrease the fuel flowrate through the primary line 70, e.g., by expanding or constricting a variable orifice defined through the fuel metering valve 72. The flow of fuel across the bypass valve 86 can be increased or decreased in response to the pressure of the primary line 70 upstream of the fuel metering valve 72. For instance, the bypass valve 86 can be hydraulically actuated to increase/decrease fuel flow according to the pressure drop across the fuel metering valve 72. Optionally, hydraulic actuation of the bypass valve 86 may be controlled according to a fluid control line 85 that operably connects the bypass valve 86 to the primary line 70, e.g., at a location downstream from the fuel metering valve 72. Accordingly, the positioning of the bypass valve 86 may be determined by the pressure of fuel flowing downstream from the fuel metering valve 72. Since the amount of fuel drawn away from the primary line 70 to the bypass line 80 will vary according to the position of the bypass valve 86, pressure within the primary line 70 may also be varied according to the position of the bypass valve 86. Moreover, pressure within the bypass line 80 may be operably linked to the pressure drop across the fuel metering valve 72.

In the embodiment of FIG. 2, the fuel pressurization valve 74 is provided downstream from the fuel metering valve 72. The fuel pressurization valve 74 includes a valve body 108 and a variable restrictor piston 110. The restrictor piston 110 may move in response to a differential pressure between the pressure at a discharge (not shown) of the fuel metering valve 72 and a reference pressure (e.g., provided at an internal spring cavity within the body 108). An electronic servo motor 112, e.g., an electrohydraulic servo valve, is optionally provided to control the position of the restrictor piston 110, e.g., by controlling the reference pressure acting on the restrictor piston 110. In some embodiments, the electronic servo motor 112 can adjust the position of the restrictor piston 110 (e.g., by adjusting the reference pressure) to increase or decrease the cross-sectional area through which fuel may flow. In response to the positioning of the restrictor piston 110, pressure upstream of the fuel pressurization valve 74, e.g., within the primary line 70, can thus be increased or decreased.

As shown, the electronic servo motor 112 of the fuel pressurization valve 74 is configured in operable communication with the control device(s) 88 e.g., through an electric or wireless signal through signal path 113. During use, a command signal, such as an electric or wireless signal, is communicated to the electronic servo motor 112. In response to a received signal, the electronic servo motor 112 can act to position the restrictor piston 110 of the fuel pressurization valve 74. The positioning of the restrictor piston 110 can generate a specified pressure between the primary line 70 and the bypass line 80. As noted above, the pressure difference between the primary line 70 and the bypass line 80 may be at least partially determinative of the pressure available to adjust or hold the component actuator 78.

In some such embodiments, the control device(s) 88 can be configured to control pressure for the variable geometry component 90 by adjusting the position of fuel pressurization valve 74. As pressure available for the variable geometry component 90 changes, the fuel pressurization valve 74 may be repositioned, e.g., via the electronic servo motor 112, to increase/decrease pressure for the variable geometry component 90. Generally, the control device(s) may continue to adjust the position of the fuel pressurization valve 74 until the pressure available for the variable geometry component 90 meets or exceeds a set demand pressure.

In exemplary embodiments, a load force or pressure ($F_M$) being applied at the component actuator 78 may be monitored (e.g., detected or calculated) by the control device(s) 88. In optional embodiments, the control device(s) 88 are configured to determine the load force or pressure ($F_M$). For instance, the control device(s) 88 may be configured to receive a condition signal from one or more sensors (not pictured) positioned within the engine 10 (see FIG. 1). The received condition signal may correspond to engine speed, compressor pressure, and/or position of the actuator 78. Moreover, the condition signal may be correlated to load force or pressure ($F_M$) (e.g., via one or more corresponding models, lookup tables, or algorithms provided within the control device(s) 88) may be provided within control device(s) 88 to correlate the received condition signal to a value for the load force or pressure ($F_M$). In other embodiments, one or more component pressure sensors 97 can be provided on the variable geometry component 90 in operable communication with the control device(s) 88 to detect the load force or pressure ($F_M$) being applied at the component actuator 78. The load force or pressure ($F_M$) provided by the component pressure sensor(s) 97 can be received by the control device(s) 88 in operable communication thereto, e.g., through an electric or wireless signal through signal path 99.

In some embodiments, the load force ($F_M$) or pressure can be registered as a demand pressure value ($P_M$) for the component actuator 78. Moreover, the control device(s) 88 can monitor (e.g., detect or compute) a pressure difference ($P_D$) between the primary line 70 and the bypass line 80. For instance, in certain embodiments, pressure within the primary line 70 and bypass line 80 may be measured via the pressure sensor(s) 102. The pressure difference ($P_D$) may be determined from the measured values as, pressure within the primary line 70 minus pressure within the bypass line 80. In additional or alternative embodiments, the pressure difference ($P_D$) may be determined by measuring the position of the fuel pressurization valve 108, e.g., at a restrictor piston 110. In such embodiments, positioning of the fuel pressurization valve 108 may be correlated to the pressure difference ($P_D$) (e.g., via one or more corresponding models, lookup tables, or algorithms provided within the control device(s) 88). A position signal from the fuel pressurization valve 108 may be directed to or read by the control device(s) 88. In turn, the control device(s) 88 may use the position signal to determine the pressure difference ($P_D$).

Once determined, the pressure difference ($P_D$) may be used to determine the pressure that is available to drive the component actuator 78. Together, the demand pressure ($P_M$) and determined or available actuator pressure ($P_D$) may be assessed as a determined value ($R_E$), e.g., an absolute value between ($P_M$) and ($P_D$) or a ratio such as ($P_M/P_D$).

Based at least in part on the determined value ($R_E$), one or more signals, e.g., output current signals, can be provided by the control device(s) 88 to alter the position of the electronic servo motor 112 and restrictor piston 110, e.g., by altering the reference pressure acting on restrictor piston 110. For instance, in some embodiments, a desired set value ($R_S$) can be provided. The control device(s) 88 can be configured to provide a continuous monitor-reposition feedback loop. In turn, the control device(s) 88 can actively adjust the position of the electronic servo motor 112 to achieve or maintain a determined value ($R_E$) that is equal to or substantially equal to the desired set value ($R_S$). Optionally, the desired set value ($R_S$) can be a single predetermined value or, alternatively, an active variable value. If the desired set value ($R_S$) is an active variable value, the desired set value ($R_S$) may be contingent upon one or more conditions of the engine, e.g., altitude, cruising speed, or flight plan. Moreover, the desired set value ($R_S$) may be selected according to one or more user inputs, or automatically selected at, e.g., the control device(s) 88.

It should be appreciated that, as used herein, the determined value ($R_E$) is substantially equal to the desired set value ($R_S$) if the determined value ($R_E$) differs from the desired set value ($R_S$) by less than 5%, such as less than 4% or less than 2% or less than 1% and any other subranges therebetween.

Figure 3:
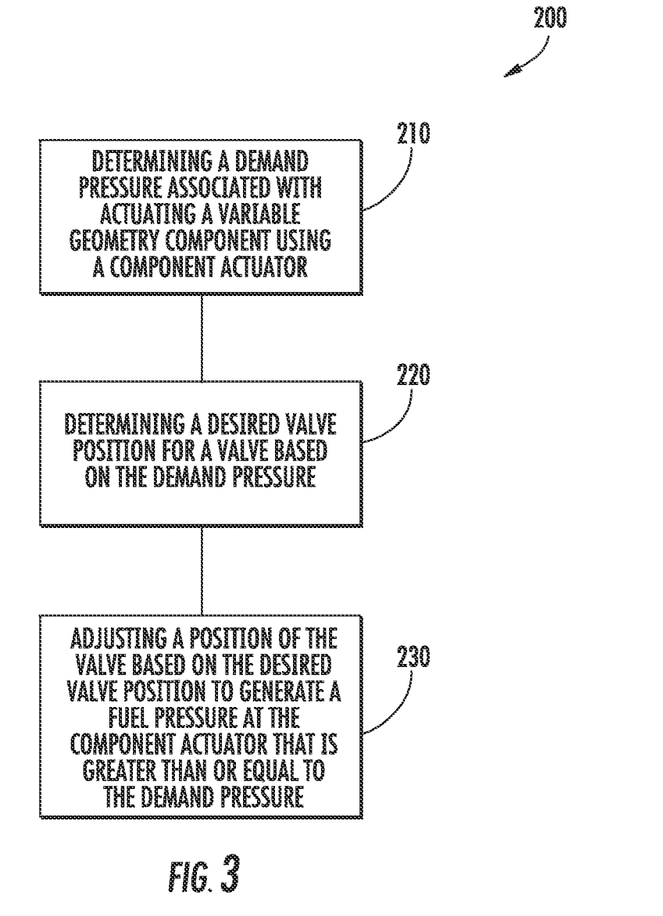
FIG. 3 provides a flow chart illustrating an example method of regulating fuel in accordance with one or more embodiments of the present disclosure.

FIG. 3 depicts a flow diagram of an example method (200) for regulating fuel, e.g., fuel pressure, within a gas turbine engine according to an example embodiment of the present disclosure. The method (200) can be implemented using, for instance, the example system 62 of FIG. 2. Accordingly, the method (200) can be performed, for instance, by one or more control device(s) 88 to regulate fuel in a gas turbine engine. FIG. 3 depicts steps performed in a particular order for purposes of illustration and discussion. It should be appreciated, however, that certain steps of any of the methods disclosed herein can be modified, adapted, rearranged, omitted, or expanded in various ways without deviating from the scope of the present disclosure.

Turning to FIG. 3, the method (200) is generally described with reference to a gas turbine engine that includes a variable geometry component operably driven by a component actuator. As described above, the component actuator can be in fluid communication with a fuel system primary line and a fuel system bypass line. At (210), the method (200) includes determining a demand pressure ($P_M$) associated with actuating the variable geometry component using the component actuator. As indicated above, in several embodiments, the demand pressure ($P_M$) may be determined by monitoring (e.g., computing or detecting) a force ($F_M$) applied to the variable geometry component. For instance, the force ($F_M$) may be detected at a component pressure sensor provided in operative association with the variable geometry component. The force measurement signals generated by the sensor may be transmitted to the control device(s). Additionally or alternatively, the force ($F_M$) may be detected by a correlation between a one or more signal received from sensor(s) positioned within the engine (e.g., to read engine speed, compressor pressure, and/or actuator positioning) and the variable geometry component. The received signal may be matched to a value of force ($F_M$) at the actuator (e.g., via one or more corresponding models, lookup tables, or algorithms provided within the control device(s)). Once detected, the control device(s) may utilize the force ($F_M$) to determine an associated demand pressure ($P_M$) for the variable geometry component.

At (220), the method (200) includes determining a desired valve position for a valve based on the demand pressure ($P_M$). Specifically, in several embodiments, the valve may correspond to a fuel pressurization valve described above with reference to FIG. 2. The desired valve position may include a set location of a restrictor within a valve body, or a relative direction of travel for the restrictor piston. As indicated above, the valve position for the fuel pressurization valve may be set or controlled based, at least in part, on the fuel pressure available to motivate the component actuator. For instance, the available fuel pressure may be monitored by the control device(s) using one or more pressure sensors, such as the first and second pressure sensors described above. Specifically, in one embodiment, the pressure sensor(s) may be used to monitor a pressure difference ($P_D$) between the primary line and the bypass line. Additionally or alternatively, the pressure difference ($P_D$) may be determined by measuring the position of the fuel pressurization valve, e.g., at a restrictor piston. In such embodiments, positioning of the fuel pressurization valve may be correlated to a value for pressure difference ($P_D$) (e.g., via one or more corresponding models, lookup tables, or algorithms provided within the control device(s)). A position signal may be directed to or read by the control device(s). Once received from the fuel pressurization valve may, the position signal may thus be used to generate a determined pressure difference ($P_D$).

In some embodiments, the control device(s) may be configured to calculate a determined value ($R_E$), which may, in turn, be used to adjust the valve position of the fuel pressurization valve. As noted above, the determined value ($R_E$) can be expressed as a value of demand pressure ($P_M$) and determined pressure difference ($P_D$), such as an absolute value between ($P_M$) and ($P_D$) or ratio, e.g., ($P_M/P_D$). The desired valve position may then be determined by comparing the determined value ($R_E$) to a desired set value ($R_S$). Specifically, in several embodiments, the valve position for the fuel pressurization valve may be adjusted such that the determined value ($R_E$) is equal or substantially equal to the desired set value ($R_S$). As indicated above, the desired value ($R_S$) may optionally include a predetermined constant value or a value that is selectively chosen according to an operating state of the gas turbine engine.

Additionally, at (230), the method (200) includes adjusting a position of the valve based on the desired valve position to generate a fuel pressure at the component actuator that is greater than or equal to the demand pressure ($P_M$). For instance, as indicated above, the control device(s) may control the position of the fuel pressurization valve by transmitting suitable position or control signals to a motor or other device configured to adjust the position of the valve. In addition, the control device(s) may be configured to provide a feedback loop to constantly monitor and transmit position signals until the determined value ($R_E$) is equal or substantially equal to the desired set value ($R_S$).

During the method (200), the flow or flowrate of fuel through a fuel metering valve may be actively changed. For instance, the method (200) may accommodate throttling a fuel metering valve upstream of a fuel pressurization valve according to a thrust demand input. Throttling can optionally include reducing the flowrate of fuel through the fuel metering valve, or increasing the flowrate of fuel through the fuel metering valve.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of regulating fuel in a gas turbine engine including a variable geometry component operably driven by a component actuator, the component actuator being in fluid communication with a primary line having a valve associated therewith, the method comprising:
   determining a demand pressure associated with actuating the variable geometry component using the component actuator;
   monitoring fuel pressure in the primary line at a location upstream from the valve;
   determining an available fuel pressure to motivate the component actuator by monitoring a pressure difference between the primary line and a bypass line as a determined pressure difference;
   calculating a determined value based at least in part on the demand pressure and the determined pressure difference;
   determining a desired valve position for the valve based on the demand pressure, wherein determining the desired valve position includes determining a valve position for the valve such that the determined value is equal or substantially equal to a desired set value; and
   adjusting a position of the valve based on the desired valve position to generate a fuel pressure at the component actuator that is greater than or equal to the demand pressure.

2. The method of claim 1, wherein the desired set value is a predetermined constant value.

3. The method of claim 1, wherein the desired set value is selectively chosen according to an operating state of the gas turbine engine.

4. The method of claim 1, wherein the valve includes a fuel pressurization valve, and wherein the method further comprises:
   throttling, by one or more control devices, a fuel metering valve upstream of the fuel pressurization valve according to a thrust demand input.

5. A fuel delivery system for a gas turbine engine, the gas turbine engine comprising a combustion section and a variable geometry component, the fuel delivery system comprising:
   a component actuator configured to actuate the variable geometry component;
   a primary line in fluid communication with the component actuator;
   a bypass line including:
      a bypass inlet disposed on the primary line to receive fuel from the primary line downstream from a servo line in fluid communication with the component actuator,
      a bypass outlet disposed on the primary line to return fuel to the primary line upstream from the servo line, and
      a bypass valve in variable fluid communication between the bypass inlet and the bypass outlet;
   a valve in fluid communication with the primary line; and
   a control device in operable communication with the valve, the control device configured to:
      determine a demand pressure associated with actuating the variable geometry component using the component actuator,
      determine a desired valve position based at least in part on an available fuel pressure for motivating the component actuator,
      determine a desired valve position for the valve based on the demand pressure, and
      adjust a position of the valve according to the desired valve position to generate a fuel pressure at the component actuator that is greater than or equal to the demand pressure.

6. The fuel delivery system of claim 5, wherein the control device is configured to monitor a fuel pressure in the primary line at a location upstream from the valve to determine the available fuel pressure.

7. The fuel delivery system of claim 5, further comprising:
   a differential pressure sensor provided in operative associated with the primary line and the bypass line, wherein the control device is further configured to monitor the pressure difference between the primary line and the bypass line as a determined pressure difference.

8. The fuel delivery system of claim 7, wherein the control device is further configured to:
   calculate a determined value based at least in part on the demand pressure and the determined pressure difference, and
   adjust the position of the valve such that the determined value is equal or substantially equal to a desired set value.

9. The fuel delivery system of claim 8, wherein the desired set value is a predetermined constant value.

10. The fuel delivery system of claim 8, wherein the desired set value is selectively chosen according to an operating state of the gas turbine engine.

11. The fuel delivery system of claim 5, wherein the valve includes a fuel pressurization valve, and wherein the fuel delivery system further comprises:
   a fuel metering valve disposed on the primary line upstream of the fuel pressurization valve.

12. A gas turbine engine defining a flow path and a central axis, the gas turbine engine comprising:
   a drive shaft extending along the central axis;
   a turbine attached to the drive shaft to provide rotation of the drive shaft;
   a combustion section positioned forward of the turbine to provide a combustion gas thereto;
   a variable geometry component positioned in the flow path of the gas turbine engine; and
   a fuel system including:
      a component actuator configured to actuate the variable geometry component,
      a primary line in fluid communication with the component actuator,
      a bypass line including
         a bypass inlet disposed on the primary line to receive fuel from the primary line downstream from a servo line in fluid communication with the component actuator,
         a bypass outlet disposed on the primary line to return fuel to the primary line upstream from the servo line, and
         a bypass valve in variable fluid communication between the bypass inlet and the bypass outlet,
      a fuel pressurization valve in fluid communication with the primary line, and
      a control device in operable communication with the fuel pressurization valve, the control device configured to:
         determine a demand pressure associated with actuating the variable geometry component using the component actuator, determine the desired valve position based at least in part on an available fuel pressure for motivating the component actuator, determine a desired valve position for the valve based on the demand pressure, and adjust a position of the valve according to the desired valve position to generate a fuel pressure at the component actuator that is greater than or equal to the demand pressure.

* * * * *